(12) United States Patent
Porskrog et al.

(10) Patent No.: US 9,926,003 B2
(45) Date of Patent: Mar. 27, 2018

(54) HYDRAULIC STEERING UNIT AND HYDRAULIC STEERING SYSTEM

(71) Applicant: Danfoss Power Solutions ApS, Nordborg (DK)

(72) Inventors: Bendt Porskrog, Nordborg (DK); Casper Mikael Olesen, Sonderborg (DK); Abdul Karim Rahimzai, Sonderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 0 days.

(21) Appl. No.: 15/147,078

(22) Filed: May 5, 2016

(65) Prior Publication Data

US 2016/0332661 A1   Nov. 17, 2016

(30) Foreign Application Priority Data

May 13, 2015   (EP) .................................... 15167575

(51) Int. Cl.
*B62D 5/06* (2006.01)
*B62D 5/093* (2006.01)
(Continued)

(52) U.S. Cl.
CPC ............. *B62D 5/062* (2013.01); *B62D 5/065* (2013.01); *B62D 5/093* (2013.01); *B62D 5/12* (2013.01); *B62D 5/18* (2013.01)

(58) Field of Classification Search
CPC ........ B62D 5/062; B62D 5/065; B62D 5/075; B62D 5/093; B62D 5/12; B62D 5/18
See application file for complete search history.

(56) References Cited

U.S. PATENT DOCUMENTS 4,011,721 A    3/1977  Yip
7,631,590 B2 * 12/2009  Thomsen ............... B62D 5/065
                                                          60/384
(Continued)

FOREIGN PATENT DOCUMENTS

CA         2605223 A1    4/2008
DE      101 64 392 A1    7/2003
(Continued)

*Primary Examiner* — Joseph M Rocca
*Assistant Examiner* — Marlon A Arce
(74) *Attorney, Agent, or Firm* — McCormick, Paulding & Huber LLP

(57) ABSTRACT

A hydraulic steering unit (3) is disclosed comprising a working port arrangement (L, R) having two working ports (L, R), a supply port arrangement having a high pressure port (P) and a low pressure port (T), a main flow path (7) having a main bleed (A1) and a metering device (8) and being arranged between said high pressure port (P) and said working port arrangement (L, R), an amplification flow path (9) having an amplification bleed (Au) and being arranged between said high pressure port (P) and said working port arrangement (L, R), said main bleed (A1) and said amplification bleed (Au) being controlled together by means of a steering handle (6) and being closed in neutral position of said steering handle (6), and a drain bleed (Ad) which is open in neutral position of said steering handle (6), said drain bleed (Ad) connecting a point (11) upstream said main bleed (A1) and said amplification bleed (Au) to said low pressure port (T).

20 Claims, 1 Drawing Sheet

(51) Int. Cl.
*B62D 5/065* (2006.01)
*B62D 5/12* (2006.01)
*B62D 5/18* (2006.01)

(56) References Cited

U.S. PATENT DOCUMENTS

| | | | |
|---|---|---|---|
| 9,242,668 B2* | 1/2016 | Ennemark | B62D 5/093 |
| 9,550,521 B2 | 1/2017 | Andersen et al. | |
| 2005/0205337 A1* | 9/2005 | Porskrog | B62D 5/093 |
| | | | 180/417 |
| 2014/0374187 A1 | 12/2014 | Arbjerg et al. | |
| 2016/0298658 A1 | 10/2016 | Liljenberg et al. | |
| 2016/0332663 A1* | 11/2016 | Porskrog | B62D 5/062 |

FOREIGN PATENT DOCUMENTS

| | | |
|---|---|---|
| EP | 2 127 998 A1 | 12/2009 |
| EP | 2 610 141 A1 | 7/2013 |
| WO | 2004/043768 A1 | 5/2004 |

* cited by examiner

HYDRAULIC STEERING UNIT AND HYDRAULIC STEERING SYSTEM

CROSS REFERENCE TO RELATED APPLICATION

Applicant hereby claims foreign priority benefits under U.S.C. § 119 from European Patent Application No. EP15167575 filed on May 13, 2015, the content of which is incorporated by reference herein.

TECHNICAL FIELD

The present invention relates to a hydraulic steering unit.

Furthermore, the invention relates to a hydraulic steering system comprising such a steering unit.

BACKGROUND

Such a steering unit is used to steer a vehicle. In most cases a steering wheel serving as steering handle is connected to the steering unit. When the steering wheel is actuated the hydraulic steering unit supplies hydraulic fluid under pressure to a steering motor. The steering motor moves steered wheels of the vehicle so that the vehicle can change its moving direction.

SUMMARY

The object underlying the invention is to enable comfortable, in particular amplified and/or variable, steering.

This object is solved with a hydraulic steering unit comprising a working port arrangement having two working ports, a supply port arrangement having a high pressure port and a low pressure port, a main flow path having a main bleed and a metering device and being arranged between said high pressure port and said working port arrangement, an amplification flow path having an amplification bleed and being arranged between said high pressure port and said working port arrangement, said main bleed and said amplification bleed being controlled together by means of a steering handle and being closed in neutral position of said steering handle, and a drain bleed which is open in neutral position of said steering handle, said drain bleed connecting a point upstream said main bleed and said amplification bleed to said low pressure port.

Such a steering unit is of open center type and has an integrated amplification function. In the neutral position of the steering handle, e.g. the neutral position of the steering wheel, there is a continuous flow of hydraulic fluid through the steering unit keeping the steering unit on the temperature of the hydraulic fluid. When, however, the steering wheel is turned or another steering handle is actuated and leaves the neutral position, the flow of hydraulic fluid through the drain bleed is decreased and a correspondingly greater part of the hydraulic fluid is directed to the main flow path and to the auxiliary flow path. Only in the main flow path the hydraulic fluid is metered. The fluid flow through the amplification flow path is made proportional or progressive to the flow through the main flow path thereby allowing an amplification of the total flow. This has the advantage that in undisturbed or normal steer mode the amplification is active and therefore only small actuations of the steering handle are necessary to have even large steering movements of the steering motor, whereas in a disturbed or emergency mode the metering device can be used as pump having a relatively low displacement.

Preferably said drain bleed is fully closed when said amplification bleed is fully open. When the amplification bleed is fully open the steering wheel (or any other steering handle) is in its extreme position. In this case all fluid flow should be directed to the motor and no fluid flow is wasted through the drain bleed.

In a preferred embodiment a torque compensator is provided establishing a pressure differential over said amplification flow path to be the same as a pressure differential over said main flow path. When the same pressure drop or pressure differential across the amplification flow path and across the main flow path is established, it can be secured that the amplification ratio between the main flow path and the amplification flow path will be constant even if a pressure drop occurs, for example at the metering device due to dirt particles or the like.

Preferably said torque compensator is formed by an adjustable flow resistance in said amplification flow path. When the flow resistance in the main flow path increases, the adjustable flow resistance in the amplification flow path is adjusted accordingly. This is a simple way to achieve the same pressure differential or pressure drop in both flow paths.

Preferably said adjustable flow resistance is adjusted by a pressure in said main flow path. Such a pressure is in all cases available and can be used in a simple way to adjust the flow resistance in the amplification flow path.

Preferably said torque compensator comprises a check valve opening in a direction towards a point downstream said metering device. In this way the torque compensator is used for an additional function. It blocks the amplification flow path in case of an emergency steering. No further elements are necessary in the amplification flow path to fulfill this function.

Preferably an emergency check valve is arranged parallel to said drain bleed opening to said point upstream said main bleed and said amplification bleed. This emergency check valve again is used in an emergency steering mode. It allows a fluid flow circulating through the main flow part and the steering motor. Furthermore, it is possible that hydraulic fluid is sucked from the low pressure port if necessary.

The invention relates as well to an steering system comprising a steering motor, a steering unit as described above, and a pump, wherein said steering unit is directly connected to said pump. In other words, no additional valving, like a priority valve, is necessary between the pump and the steering unit.

Hereby it is preferred that said pump is a fixed displacement pump. This makes the system cost effective.

BRIEF DESCRIPTION OF THE DRAWINGS

A preferred embodiment of the invention is now described in more detail with reference to the drawing, wherein.

DETAILED DESCRIPTION

Figure 1:
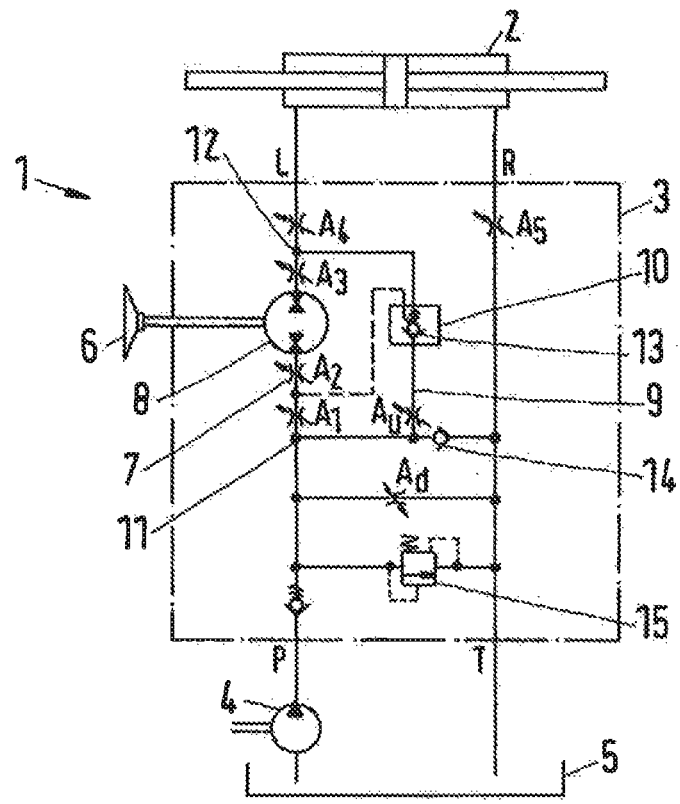
FIG. 1: is a schematic illustration of a steering system.

FIG. 1 shows schematically a hydraulic steering system 1 which comprises a steering motor 2, a steering unit 3, a pump 4 or any other pressure source, and a tank 5. In the present case, the pump 4 is a fixed displacement pump.

A steering wheel 6 is connected to the steering unit 3. However, any other kind of steering handle can be used instead of the steering wheel 6.

The steering unit 3 comprises a working port arrangement having two working ports L, R connected to said steering motor 2, a supply port arrangement having a high pressure port P and a low pressure port T. Furthermore, the steering unit 3 comprises a main flow path 7 in which a metering device 8 is located. The metering device 8 is connected in series with a main bleed A1 and other bleeds A2, A3. Furthermore, depending on a steering direction, the metering device 8 is connected with bleed A4 for the left working port L or to the right working port R. The other one of these two working ports R, L is connected to low pressure port T via bleed A5.

An amplification flow path 9 is connected parallel to a part of the main flow path 7. An amplification bleed Au is located in the amplification flow path 9. Furthermore, a torque compensator 10 is connected in series with the amplification bleed Au.

The amplification flow path 9 is connected to a point 11 upstream the main bleed A1. Furthermore, the amplification flow path 9 is connected to a point 12 between bleed A3 and bleed A4. In other words, the amplification flow path 9 is basically arranged in parallel to the main flow path 7.

The torque compensator 10 comprises a check valve 13 opening in the direction to point 12 between bleeds A3 and A4.

The steering motor 2 is connected to the two working ports L, R. Depending on the direction of steering, one of the bleeds A4, A5 is connected to the low pressure port T.

A drain bleed Ad connects point 11 upstream the main bleeds A1 and upstream the amplification bleed Au and the low pressure port T.

An emergency check valve 14 connects the low pressure port T with point 11 upstream the main bleed A1 and the amplification bleed Au.

Figure 2:
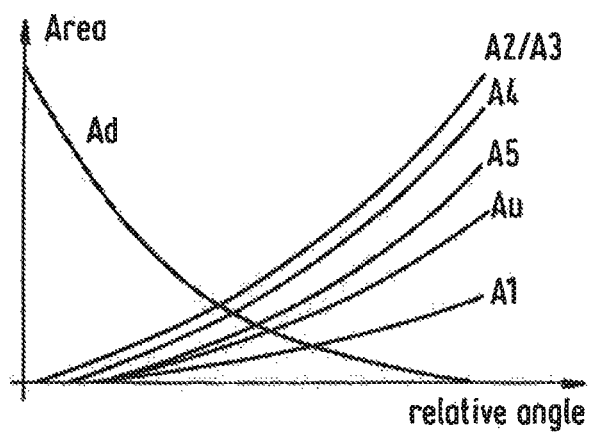
FIG. 2: shows the opening behavior of the bleeds of the steering unit.

The bleeds A1-A5, Au and Ad are formed between a spool and a sleeve. One of spool and sleeve is connected to the steering wheel 6 and the other of spool and sleeve is connected to the metering device 8. When the spool and the sleeve are rotated relative to each other because of an actuation of the steering wheel 6, the bleeds A1-A5, Au open, i.e. they increase an area through which hydraulic fluid can flow whereas the drain bleed Ad closes, i.e. decreases the area through which hydraulic fluid can flow. The opening and closing characteristics of the bleeds A1-A5, Au, and Ad are schematically shown in FIG. 2.

At an relative angle of 0° between spool and sleeve the drain bleed Ad is fully open whereas all other bleeds A1-A5 and Au are closed. Hydraulic fluid supplied by the pump 4 via the high pressure port P flows through the drain bleed Ad back to the low pressure port T.

When turning the steering wheel 6 the drain bleed Ad will closed gradually over the entire control range: relative angle spool to sleeve is usually from 0° to full deflection of approximately 15°. The other bleeds A1-A5 and Au will open in parallel. The opening area will depend on the pressure demand on the working port L, R to which hydraulic fluid is metered into. The higher pressure demand, the more drain bleed Ad must be closed and so the deflection spool to sleeve increases.

The hydraulic fluid flow for steering will be split between the parallel connected inlet bleeds, i.e. the main bleed A1 and the amplification bleed Au. The flow of hydraulic fluid across main bleed A1 is determined by the size of the metering device 8 and the speed of the steering wheel 6. The flow of hydraulic fluid across the amplification bleed Au is determined by the opening area of this amplification bleed Au. The torque compensator 10 will secure the same pressure drop across the main amplification path (amplification bleed Au and torque compensator 10) and the main flow path (main bleed A1, A2, A3, metering device 8).

The torque compensator 10 keeps the pressure drop across the main bleed A1 and across the amplification bleed Au to be the same and so the amplification will be constantly independent on steering speed under normal steering conditions. The pump 4 must as minimum be able to supply requested flow and pressure of hydraulic fluid for the steering movement.

A pressure relieve valve 15 is arranged between the high pressure port P and the low pressure port T.

When the steering motor 2 has moved to end stroke or when pressure demand is higher than setting of the pressure relieve valve 15 and the steering wheel 6 is still turned, the spool/sleeve set will be forced into maximum deflection. Thus the drain bleed Ad will be closed and the relieve valve 15 will open to lead hydraulic fluid to tank 5.

As mentioned above, the torque compensator 10 will secure the same pressure drop across the amplification path 9 including the amplification bleed Au as across the main flow path with main orifice A1, the spool/sleeve set (not shown in FIG. 1), the metering device 8 and bleeds A2 and A3. In case pressure drop may occur across the metering device 8, e.g. due to dirt particles entering the steering unit, the torque compensator 10 will generate the same pressure drop for the hydraulic fluid in both flow paths. In this way the amplification ratio will remain constant. As mentioned above, the torque compensator comprises a check valve 13 opening in a direction from point 11 to point 12. The check valve 13 is loaded in closing direction by pressure between main bleed A1 and bleed A2, in other words by a pressure downstream the main bleed A1.

When the pressure at the high pressure port P does not match the steering pressure requested, the metering device 8 will act as a hand pump, when torque is applied to the steering wheel 6. The displacement for emergency steering is purely determined by the size of the metering device 8. The check valve function of torque compensator 10 will prevent back stream of hydraulic fluid across the amplification bleed Au.

When pump flow becomes insufficient, the emergency steering check valve 14 will open and hydraulic fluid will be lead to the metering device 8 from return side of steering motor 2. Additional flow can be sucked from the low pressure port T as needed.

As mentioned above, the pump 4 is a fixed displacement pump. It is directly connected to the steering unit 3, i.e. a priority valve or the like can be omitted. This makes the whole system cost effective.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a working port arrangement (L, R) having two working ports (L, R), a supply port arrangement having a high pressure port (P) and a low pressure port (T), a main flow path having a main bleed (A1) and a metering device and being arranged between said high pressure port (P) and said working port arrangement (L, R), an amplification flow path having an amplification bleed (Au) and being arranged between said high pressure port (P) and said working port arrangement (L, R), said main bleed (A1) and said amplification bleed (Au)

being controlled together by means of a steering handle and being closed in neutral position of said steering handle, and a drain bleed (Ad) which is open in neutral position of said steering handle, said drain bleed (Ad) connecting a point upstream said main bleed (A1) and said amplification bleed (Au) to said low pressure port (T), wherein a connection of said drain bleed (Ad) to said main flow path is upstream from said main bleed (A1) and said amplification bleed (Au).

2. The hydraulic steering unit according to claim 1, wherein said drain bleed (Ad) is fully closed, when said amplification bleed (Au) is fully open.

3. The hydraulic steering unit according to claim 1, wherein a torque compensator is provided establishing a pressure differential over said amplification flow path to be the same as a pressure differential over said main (A1, A2, A3).

4. The hydraulic steering unit according to claim 3 said torque compensator is formed by an adjustable flow resistance in said amplification flow path.

5. The hydraulic steering unit according to claim 4, wherein said adjustable flow resistance is adjusted by a pressure in said main flow path.

6. The hydraulic steering unit according to claim 3, wherein said torque compensator comprises a check valve opening in a direction towards a point downstream said metering device.

7. The hydraulic steering unit according to claim 1, wherein an emergency check valve is arranged parallel to said drain bleed (Ad) opening to said point upstream said main bleed (A1) and said amplification bleed (Au).

8. A hydraulic steering system comprising a steering motor, said hydraulic steering unit according to claim 1, and a pump, wherein said hydraulic steering unit is directly connected to said pump.

9. The hydraulic steering system according to claim 8, wherein said pump is a fixed displacement pump.

10. The hydraulic steering unit according to claim 2, wherein a torque compensator is provided establishing a pressure differential over said amplification flow path to be the same as a pressure differential over said main (A1, A2, A3).

11. The hydraulic steering unit according to claim 4, wherein said torque compensator comprises a check valve opening in a direction towards a point downstream said metering device.

12. The hydraulic steering unit according to claim 5, wherein said torque compensator comprises a check valve opening in a direction towards a point downstream said metering device.

13. The hydraulic steering unit according to claim 2, wherein an emergency check valve is arranged parallel to said drain bleed (Ad) opening to said point upstream said main bleed (A1) and said amplification bleed (Au).

14. The hydraulic steering unit according to claim 3, wherein an emergency check valve is arranged parallel to said drain bleed (Ad) opening to said point upstream said main bleed (A1) and said amplification bleed (Au).

15. The hydraulic steering unit according to claim 4, wherein an emergency check valve is arranged parallel to said drain bleed (Ad) opening to said point upstream said main bleed (A1) and said amplification bleed (Au).

16. Hydraulic steering unit according to claim 5, wherein an emergency check valve is arranged parallel to said drain bleed (Ad) opening to said point upstream said main bleed (A1) and said amplification bleed (Au).

17. The hydraulic steering unit according to claim 6, wherein an emergency check valve is arranged parallel to said drain bleed (Ad) opening to said point upstream said main bleed (A1) and said amplification bleed (Au).

18. A hydraulic steering system comprising a steering motor, said hydraulic steering unit according to claim 2, and a pump, wherein said hydraulic steering unit is directly connected to said pump.

19. A hydraulic steering system comprising a steering motor, said hydraulic steering unit according to claim 3, and a pump, wherein said hydraulic steering unit is directly connected to said pump.

20. A hydraulic steering system comprising a steering motor, said hydraulic steering unit according to claim 4, and a pump, wherein said hydraulic steering unit is directly connected to said pump.

* * * * *